April 10, 1956
C. W. GADD ET AL
2,741,128
COMBUSTION CHAMBER PRESSURE INDICATOR
Filed March 19, 1952
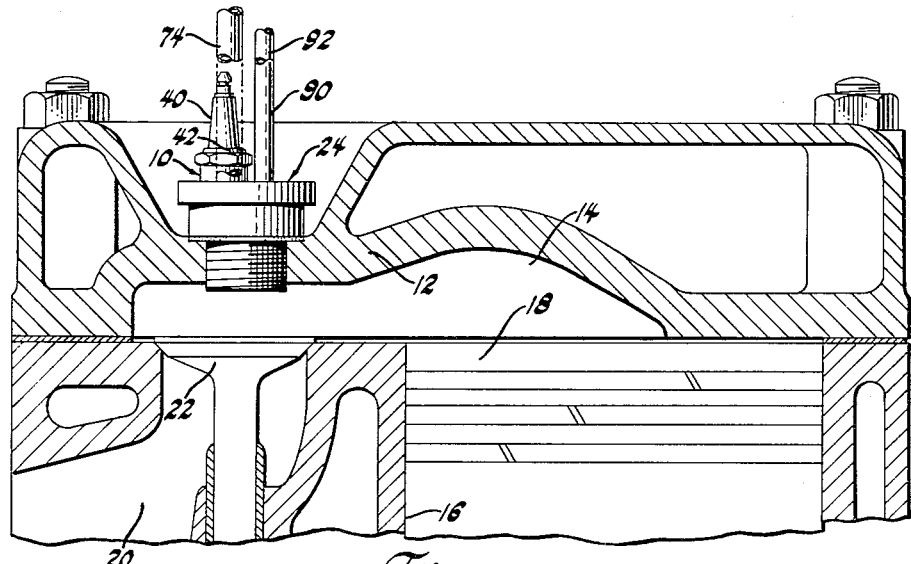
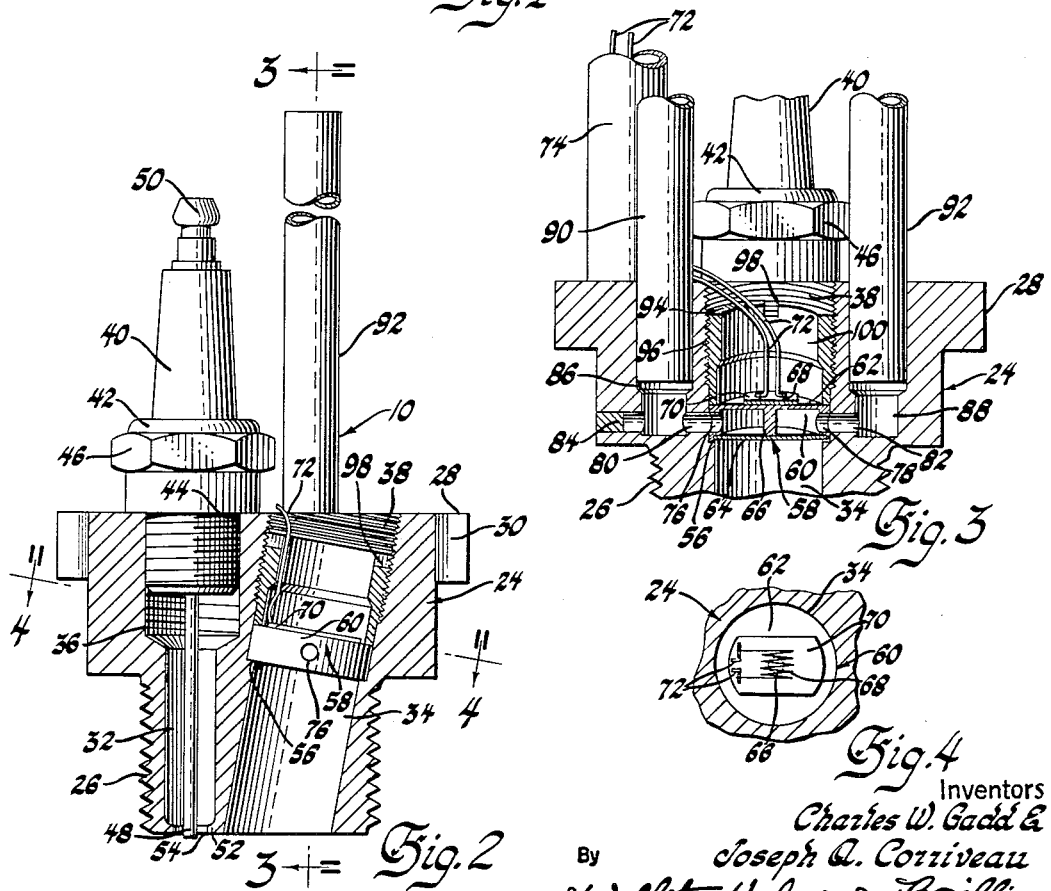
Inventors
Charles W. Gadd &
Joseph A. Corriveau
By Willits, Helwig & Baillio
Attorneys

United States Patent Office 2,741,128
Patented Apr. 10, 1956

2,741,128

COMBUSTION CHAMBER PRESSURE INDICATOR

Charles W. Gadd, Orchard Lake, and Joseph A. Corriveau, Detroit, Mich., assignors to General Motors Corporation, Detroit, Mich., a corporation of Delaware Application March 19, 1952, Serial No. 277,482

5 Claims. (Cl. 73—398)

This invention relates to a combination pressure indicator and igniter and particularly to an improved unit for simultaneously igniting a fuel mixture in an internal combustion engine and accurately measuring pressure variations therein.

Heretofore the measurement of pressure changes within a combustion chamber of an internal combustion engine generally has required a special opening in the cylinder head for insertion of a separate pressure-measuring device. Such a construction necessitates reworking of the engine head, often an impractical and difficult operation, which frequently prevents the effective use of pressure indicators for purposes where they would otherwise be of value. An additional opening also necessarily affects combustion characteristics of the air and fuel mixture by altering the cooling characteristics of the head, by varying the volume of the combustion chamber, or by impeding flame travel due to the projection of the pressure-measuring device into the combustion chamber. In turn, the resultant alteration of the combustion characteristics precludes the possibility of obtaining very accurate indications of actual combustion chamber pressures.

A principal object of the invention, therefore, is to provide a pressure indicating unit which eliminates this need for a special opening in the cylinder head of an internal combustion engine and which thus permits more accurate measurement of rapid pressure variations within a combustion chamber thereof. It is a further object of the present invention to provide an inexpensive, compact, sturdy, and highly sensitive pressure indicating unit of this type.

In accordance with the invention, the necessity of forming special indicator openings in the cylinder head of every engine which it is desired to test is eliminated by providing a unit comprising a combination pressure indicator and igniter, such as a spark plug, for both igniting the air-fuel unit in an engine and measuring pressure variations within a combustion chamber thereof. A housing, which supports the igniter portion, is provided with a bore which is adapted to communicate with the combustion chamber. Within this bore is positioned a thin deflectable plate or disk diaphragm, which is deformably responsive to pressure changes in the combustion chamber. A strain gage wire is mounted on and electrically insulated from the deflatable plate. No previous preparation of the engine is necessary, and its performance is unaffected by the installation of the subject device.

The pressure indicator thus formed in conjunction with the igniter or spark plug is adapted to expose the deformable plate to the combustion chamber pressure of the engine so that changes in this pressure will affect the external dimensions of the plate to a sufficient extent to alter the length of the strain gage wire mounted thereon. The resultant changes in the cross-sectional dimensions of the wire vary its resistance, the latter being a direct indication of the internal pressure to which the plate is subjected. These changes in the resistance of the strain gage wire may influence suitable recording devices, such as meters or oscillographs, in a known manner.

This unit possesses the advantage of being rigid enough to substantially eliminate effects due to mechanical distortion, and the diaphragm is positioned near enough to the combustion chamber to minimize the Helmholtz resonance or restrictive effects of the housing bore, thereby permitting the study of heating effects alone. Moreover, this pressure indicator is especially suitable for measuring the rapidly fluctuating pressures in combustion chambers because of the small size of the indicator and the high speed response provided. The entire pressure measuring portion of the unit is located outside the combustion chamber and hence cannot possibly affect combustion characteristics, such as flame travel, of the engine.

The use of wire which is electrically sensitive to strain is advantageous because of its inherent linearity, ease of temperature compensation, and ease of application. Such a wire is also stable and simple to calibrate.

Unusually high sensitivity, regardless of temperature or speed, is obtained by providing a means for cooling the strain gage wire and the deflectable wall on which it is mounted. This may be done by conveying a fluid coolant between a pair of thin, spatially separated plates or walls in the aforementioned housing bore, one of the plates being provided with the strain gage wire. These plates are operatively connected to transmit deflection therebetween, and, in effect, constitute a water-cooled deformable drum. Thus there is provided a highly accurate pressure measuring device in which heating and distortion of the strain gage wire is reduced to such an extent so that calibration of the unit is not variable. The use of coolant passages for maintaining the strain gage wire at a uniform temperature, regardless of the speed of operation of the engine being tested, further aids in eliminating cyclical resistance indications due to temperature variations in the wire or supporting shell.

Other objects and advantages of this invention will more fully appear from the following description of a preferred embodiment of the invention shown in the accompanying drawing, in which:

Figure 1 is a fragmentary vertical view of an internal combustion engine having, mounted therein, a spark plug and pressure indicating unit embodying the invention;

Figure 2 is an enlarged vertical view, partly in elevation and partly in section, of the spark plug pressure indicator unit shown in Figure 1;

Figure 3 is a fragmentary sectional view generally along the line 3—3 of Figure 2, showing the details of construction of the water-cooled drum; and Figure 4 is a fragmentary sectional view along the line 4—4 of Figure 2.

Referring more specifically to the drawing, in Figure 1 is shown a combination spark plug and pressure indicating unit, designated generally by 10, mounted in a cylinder head 12 of an internal combustion engine having a combustion chamber 14, a cylinder 16, a piston 18, and a valve port 20 closed by a poppet valve 22. As best shown in Figure 2, the spark plug indicator unit 10 has a metallic support or housing 24 with its lower portion preferably provided with external threads 26. This housing is shown as being of generally cylindrical construction and having an annular flange 28 at its upper end. Notches or slots 30, which are engageable by a wrench or other suitable tool, may be provided in the flange to aid in the installation of the unit in the cylinder head.

A pair of generally longitudinally extending openings or bores 32 and 34 are drilled or otherwise formed in the housing 24. The smaller opening 32 has a generally cylindrical upper portion and a similarly shaped lower portion of reduced diameter, the former being provided with internal threads 36. The larger bore 34 is shown as being angularly arranged relative to the longitudinal axis of the housing 24 to permit the externally threaded portion 26 of the housing to be formed the same size as the threaded portion of a standard spark plug shell without unduly reducing the sizes of the pressure indicator or spark plug portions of the unit. The upper half of the bore 34 is slightly larger than the lower portion and also is provided with internal threads 38.

The spark plug portion of the unit includes an insulator 40 of ceramic or other suitable material positioned within a metallic supporting shell 42. This shell has its lower portion preferably provided with external threads 44 which are engageable with the internal threads 36 in the housing opening 32. The upper portion of the shell 42 is shown as having the conventional polygonal construction 46 to aid in the installation of the unit in the housing.

Within the insulator 40 and separated from the shell 42 is an elongated central electrode 48 which projects slightly below the lower end of the housing 24. Extending from the upper end of the insulator is a contact terminal 50 which has electrical communication within the insulator with the central electrode. The lower end of the threaded portion 26 of the housing is provided with an annular lip or flange 52 which projects radially into proximity to the lower end of the central electrode 48 to form a spark gap 54 therebetween.

It will be understood, of course, that the housing 24 and the shell 42 could be integrally formed, but in the modification shown in the drawings a 6 mm. spark plug is used to cooperate with the housing to provide a convenient and effective igniting unit.

Positioned within the bore 34 near the lower end of its upper enlarged portion and resting on a shoulder 56 is a small hollow drum 58. This drum, as shown in Figure 3, includes a cup-shaped member 60 having generally cylindrical side walls and a thin deflectable top wall 62. A thin-walled disk or diaphragm 64 constitutes the bottom wall of the drum and may be secured to the member 60 by crimping the lower edges of the side walls of the latter over the diaphragm. Both the diaphragm 64 and the upper wall of the drum preferably have a thickness in the order of 0.01″ in order to provide optimum sensitivity and durability. The cup-shaped member may be of heat-treated stock, while best results are obtained if the diaphragm is formed of spring steel. It is often desirable to copper or tin plate both the member 60 and the diaphragm before assembly, and in some instances it may be desirable to hydrogen-braze these parts after the crimping operation. A rigid pedestal or strut 66, which is shown in Figure 4 as being generally cylindrical, projects from the deformable top wall 62 of the cup-shaped member and contacts the upper surface of the diaphragm 64.

Mounted on the upper surface of the wall 62 is a strain gage or resistance wire 68 of a suitable small size so that a high electric resistance per unit length is obtained. Inasmuch as the drum 58 is exposed to the hot combustion gases from the combustion chamber, it is desirable to employ a wire of a metal or alloy having a low coefficient of thermal expansion and a low temperature coefficient of electrical resistance. The use of such a material reduces any cyclical indications caused by temperature variations rather than by dimensional changes in the wire. This is particularly important for measuring small pressure fluctuations where resistance changes due to strain are correspondingly small.

The strain gage wire 68 may be secured throughout its length to the upper wall of the drum and electrically insulated therefrom by a suitable insulating cement 70, and the segments of the wire may be completely coated with this cement to prevent short-circuiting of the electric current through adjacent segments of the wire. Alternatively, the functions of securing and insulating may be performed independently by coating the wire or the top surface of the wall 62, as appropriate, with a film of electrical insulating varnish and cementing the wire at suitable points to this surface. Of course, the most practical procedure is to use a commercially available wire strain gage, such as a 1/16 inch gage having the resistance wire embedded in the insulating cement 70, and attach the entire unit to the supporting drum.

The ends of the strain gage wire are connected, by soldering or other suitable means, to electrical leads 72. These leads extend into the lower end of an upwardly projecting conduit or tube 74, which is fitted into an appropriate drilled opening, not shown, in the flange 28 of the housing 24. Of course, the lead wires are electrically insulated from each other and from the remainder of the unit in the usual manner. These leads provide electrical connection between the strain gage wire 68, a suitable source of electric current, and an appropriate measuring instrument, not shown, such as a meter or oscillograph.

As hereinbefore indicated, more accurate pressure measurements may be obtained if the strain gage wire is maintained at a uniform temperature by providing a means for effectively cooling it. As best shown in Figure 3, a pair of holes 76 and 78 are provided in opposite portions of the side walls of the cup-shaped member 60. Similarly, radial passages 80 and 82 are drilled or otherwise formed in the adjacent walls of housing 24 and register with holes 76 and 78. The end of the passage 80 is shown as sealed with a plug 84, preferably of brass. A pair of longitudinally extending openings 86 and 88 also are provided in the walls of the housing and communicate with passages 80 and 82. A fluid coolant, preferably water, thus may be introduced into the hollow drum by means of a duct or tube 90 of brass or other suitable material which is press fitted into the longitudinal opening 86 in the housing. Similarly, an outlet tube 92 for the coolant, corresponding to inlet tube 90, may be fitted into the opposite longitudinal opening 88 in the housing for conveying the coolant from the drum. Rubber or other flexible tubing, not shown, may be employed to connect the tubes 90 and 92 with the coolant supply.

As the air-fuel mixture within the combustion chamber 14 is ignited by the formed spark plug, the increased pressure within this chamber and the bore 34 of the housing upwardly flexes the thin deformable diaphragm 64. This upward deflection of the diaphragm in turn forces the pedestal or strut 66 upwardly, resulting in a similar deflection of the upper wall 62 of the drum. Of course, the lower edge of the strut 66 is at all times in firm contact with the diaphragm to provide the instrument with high sensitivity. The upward expansion or deformation of the top wall of the drum elongates the attached strain gage wire 68, thereby decreasing its cross-sectional area and accordingly increasing its electrical resistance. These changes in electrical resistance are direct indications of the combustion chamber pressure and may be measured by appropriate electrical means, as hereinbefore indicated.

In order to maintain the drum 58 in position and to prevent its being forced upwardly out of the bore 34 by the pressure resulting from combustion of the fuel mixture, a sleeve or retainer 94 is affixed in this bore above the drum. This retainer, which is shown as being generally cylindrical in shape, has its outer surfaces provided with suitable threads 96 which engage the internal threads 38 in the bore 34. Appropriate wrench slots 98 may be formed in the upper end of the side walls of the retainer to facilitate threading it into the bore. The longitudinally extending opening 100 defined by the retainer is shown as being enlarged at its lower end to allow sufficient space for the strain gage wire 68. This opening, which permits the leads 72 from the strain gage wire to extend through the retainer to the conduit 74, should be substantially unobstructed so that the upper wall 62 of the drum and the attached strain gage wire communicate freely with the atmosphere. Such a construction eliminates the possibility of momentarily compressing the air above the drum by the upward deflection of this wall and thus provides the unit with greater sensitivity.

While the described embodiment of the present invention constitutes a preferred form, it is to be understood that other modifications and variations relative to details of structure and arrangement may be made without departing from the scope of the invention as defined in the appended claims.

We claim:

1. A high speed pickup unit adaptable for insertion in the cylinder head of an internal combustion engine for measuring pressure variations within a combustion chamber thereof, said unit comprising a housing provided with a bore for communicating with the combustion chamber and exposed to the pressure changes therein, a generally hollow drum having deflectable upper and lower walls mounted in said bore, means within said drum for transmitting deflection between said walls, and a wire whose electrical resistance varies with the strain mounted on said upper wall and electrically insulated therefrom.

2. A combination igniter and pressure measuring unit comprising a housing mountable in a spark plug opening of an internal combustion engine and provided with a bore adapted to communicate with the combustion chamber thereof, a spark plug mounted in said housing and adapted to cooperate therewith to ignite a fuel mixture in said combustion chamber, a pair of thin diaphragmatic partitions secured within and sealing said bore, said partitions being spatially separated and deformably responsive to pressure changes within the combustion chamber, said housing being provided with coolant passages for conveying a fluid coolant between said partitions, and a strain gage wire mounted on one of said partitions, said wire being adapted for electrical connection with a source of electric current and with means for measuring changes in the electric resistance of said wire.

3. A unit for insertion in a cylinder head of an internal combustion engine for simultaneously firing said engine and measuring pressure changes within the combustion chamber thereof, said unit comprising a housing provided with a generally longitudinally extending opening and a bore for communicating with said combustion chamber and exposed to the pressure changes therein, an igniter mounted within said opening and cooperating with said housing to form a fuel ignition means, a generally cylindrical drum having deflectable upper and lower walls mounted within said bore, means within said drum for transmitting deflections of said lower wall to said upper wall, means associated with the drum for conveying a coolant therethrough, and a wire whose electrical resistance varies with its strain mounted on the upper wall of said drum and electrically insulated from the housing, said wire being adapted for electrical connection with resistance measuring means.

4. A combination igniter and pressure indicating unit comprising a housing for insertion in the cylinder head of an internal combustion engine, said housing being provided with a pair of generally longitudinally extending openings adapted for communication with a combustion chamber of said engine, a spark plug mounted in one of said openings and having an elongated central electrode cooperating with the walls of said housing to form a spark gap, a generally hollow drum positioned in said other opening and exposed to the pressure variations within the combustion chamber, the upper and lower walls of said drum being deflectable in response to said pressure variations and being interconnected by a strut to transmit deflections therebetween, the side walls of said drum having apertures therein, said housing being provided with coolant passages communicating with said apertures to convey a coolant through said drum, a wire electrically sensitive to strain mounted on the outer surface of said upper deflectable wall and secured thereto but insulated therefrom so as to be strained in accordance with the deformation of said wall, electrical leads associated with said wire for electrical connection with means for measuring resistance changes therein, and a retainer secured in the opening of the housing in which the drum is positioned, said retainer abutting the upper surface of said drum to maintain it in position within said housing.

5. A unit for measuring pressure changes in a combustion chamber of an internal combustion engine, said unit comprising a housing mountable on said engine and having a bore adapted to communicate with said combustion chamber, a pair of thin diaphragmatic partitions secured within and sealing said bore, said partitions being spatially separated and deformably responsive to pressure changes within said combustion chamber, said housing being provided with passages for conveying a fluid coolant between said partitions, and a strain gage wire mounted on one of said partitions, said wire being adapted for electrical connection with a source of electric current and with means for measuring changes in the resistance of said wire.

References Cited in the file of this patent

UNITED STATES PATENTS

| | | |
|---|---|---|
| 1,861,021 | Martin | May 31, 1932 |
| 2,068,744 | Gutzke | Jan. 26, 1937 |
| 2,266,315 | Frawley et al. | Dec. 16, 1941 |
| 2,400,467 | Ruge | May 14, 1946 |
| 2,472,045 | Gibbons | May 31, 1949 |
| 2,629,801 | Warshaw | Feb. 24, 1953 |

OTHER REFERENCES

Electronics, July 1935, pp. 212, 213 and 223.